US012736757B2

(12) United States Patent
Hu et al.

(10) Patent No.: US 12,736,757 B2
(45) Date of Patent: Sep. 15, 2026

(54) DUAL-CORE CONNECTOR AND CONNECTION SYSTEM

(71) Applicant: HUAWEI TECHNOLOGIES CO., LTD., Shenzhen (CN)

(72) Inventors: Jian Hu, Wuhan (CN); Yida Wen, Leuven (BE); Xiupeng Li, Wuhan (CN)

(73) Assignee: Huawei Technologies Co., LTD., Shenzhen (CN)

( * ) Notice: Subject to any disclaimer, the term of this patent is extended or adjusted under 35 U.S.C. 154(b) by 330 days.

(21) Appl. No.: 18/397,600

(22) Filed: Dec. 27, 2023

(65) Prior Publication Data

US 2024/0126024 A1 Apr. 18, 2024

Related U.S. Application Data

(63) Continuation of application No. PCT/CN2022/075527, filed on Feb. 8, 2022.

(30) Foreign Application Priority Data

Jun. 30, 2021 (CN) ......................... 202110735073.5

(51) Int. Cl.
*G02B 6/38* (2006.01)

(52) U.S. Cl.
CPC ........... *G02B 6/3858* (2013.01); *G02B 6/387* (2013.01); *G02B 6/3871* (2013.01); *G02B 6/3879* (2013.01); *G02B 6/3885* (2013.01)

(58) Field of Classification Search
CPC ............................ G02B 6/3831; G02B 6/3851
See application file for complete search history.

(56) References Cited

U.S. PATENT DOCUMENTS 8,834,038 B2 * 9/2014 Limbert ................... G02B 6/36 385/59
10,996,404 B2 * 5/2021 Ishikawa .............. G02B 6/3889
(Continued)

FOREIGN PATENT DOCUMENTS

CN 203232997 U 10/2013
CN 106383383 A 2/2017
(Continued)

OTHER PUBLICATIONS

Siemon.com [online], "Fiber Optic Cabling Systems" Mar. 2019, retrieved on Jan. 12, 2025, retrieved from URL <https://www.siemon.com/en/home/systems/fiber/cabling-systems>, 7 pages.
(Continued)

*Primary Examiner* — Rhonda S Peace
(74) *Attorney, Agent, or Firm* — Fish & Richardson P.C.

(57) ABSTRACT

Examples of dual core connectors and connection systems are disclosed. In an implementation, a dual core connector comprises a plug assembly and an engagement assembly, the plug assembly comprises a housing and ferrules. The housing has a through hole that penetrates through a first surface and an opposing second surface of the housing. The ferrules are both located within the housing and extend in the length direction of the housing, and axes of the ferrules are separately located at two sides of the through hole. The engagement assembly comprises an engagement member and a shaft body, one end of the shaft body is connected to the engagement member, and the other end of the shaft body is rotatably connected within the through hole, and when the shaft body is rotated relative to the housing into a locked position, the shaft body and the housing can lock together.

20 Claims, 9 Drawing Sheets

(56) References Cited

U.S. PATENT DOCUMENTS

| | | | | |
|---|---|---|---|---|
| 2014/0056562 | A1 | 2/2014 | Limbert et al. | |
| 2017/0254966 | A1 | 9/2017 | Gniadek et al. | |
| 2018/0217340 | A1 | 8/2018 | Wong et al. | |
| 2020/0049902 | A1 | 2/2020 | Li | |
| 2024/0126024 | A1 * | 4/2024 | Hu | G02B 6/3879 |

FOREIGN PATENT DOCUMENTS

| | | | | |
|---|---|---|---|---|
| CN | 111999819 | A | | 11/2020 |
| CN | 213457450 | U | | 6/2021 |
| CN | 113568109 | A | | 10/2021 |
| CN | 217085325 | U | * | 7/2022 |

OTHER PUBLICATIONS

US Conec, "Duplex LC Uniboot Overview Video SM V107 0320" Mar. 2020, retrieved on Jan. 12, 2025, retrieved from URL <https://youtu.be/wDo-3hZUuik>, 1 page.

Senko Group, "Senko LC Switchable Uniboot Connector" Jan. 2015, retrieved on Jan. 12, 2025, retrieved from URL <https://vimeo.com/124035944>, 1 page.

Senko Advanced Components, "Senko LC EZ-Flip Polarity Reversible Connector" Mar. 2019, retrieved on Jan. 12, 2025, retrieved from URL <https://www.youtube.com/watch?v=aL7BDdfrE08>, 1 page.

International Search Report and Written Opinion in International Appln. No. PCT/CN2022/075527, mailed on May 12, 2022, 20 pages (with English translation).

Extended European Search Report in European Appln. No. 22831185.8, mailed on Sep. 27, 2024, 8 pages.

* cited by examiner

DUAL-CORE CONNECTOR AND CONNECTION SYSTEM

CROSS-REFERENCE TO RELATED APPLICATIONS

This application is a continuation of International Application No. PCT/CN2022/075527, filed on Feb. 8, 2022, which claims priority to Chinese Patent Application No. 202110735073.5, filed on Jun. 30, 2021. The disclosures of the aforementioned applications are hereby incorporated by reference in their entireties.

TECHNICAL FIELD

This application relates to the field of optical fiber connection, and in particular, to a dual-core connector and a connection system.

BACKGROUND

A dual-core connector is a common optical fiber connector, and is applicable to duplex communication.

In a conventional technology, the dual-core connector mainly includes a housing and two ferrules. The housing is configured to clamp to an adapter. The two ferrules are detachably arranged in parallel in the housing, and are configured to respectively connect two different optical fibers. After the dual-core connector and the adapter are clamped together, the two ferrules respectively correspond to two different sockets of the adapter. In this way, an optical fiber connected to one ferrule can transmit a signal in one direction, and an optical fiber connected to the other ferrule can transmit a signal in an opposite direction. This implements duplex communication.

However, when polarities (signal transmission directions) of the two optical fibers are switched, the two ferrules need to be disassembled from the housing, positions of the two ferrules need to be switched, and then the two ferrules are reinstalled into the housing. This process is very complex.

SUMMARY

Embodiments of this application provide a dual-core connector and a connection system, to resolve a problem of inconvenience of switching optical fiber polarities. Technical solutions are as follows.

According to a first aspect, a dual-core connector is provided, where the dual-core connector includes a plug assembly and a clamping assembly. The plug assembly includes a housing and at least two ferrules. The housing has a through hole, and the through hole penetrates a first surface and a second surface of the housing. The first surface and the second surface are disposed opposite to each other. The housing provides an installation basis for the ferrules. The ferrules are located in the housing. The ferrules extend along a length direction of the housing, and are respectively located on two sides of the through hole. Axes of the ferrules are respectively located on the two sides of the through hole. The clamping assembly includes a clamping component and a shaft. The shaft has two ends. One end of the shaft is connected to the clamping component, and the other end of the shaft is rotatably connected in the through hole. The shaft is rotated, so that when the shaft is rotated to a locking position, the shaft and the housing can lock each other. This completes installation between the clamping assembly and the plug assembly.

The dual-core connector provided in this embodiment of this application has at least the following effects.

When the dual-core connector provided in this embodiment of this application is used, different optical fibers are respectively inserted into the ferrules. The shaft is inserted into one end that is of the through hole and that corresponds to the first surface, and is rotated relative to the housing to the locking position. In this case, the shaft and the housing lock each other. The clamping component is located on one side of the first surface of the housing, the clamping assembly and the plug assembly are installed together, and the dual-core connector is in a first polarity state. When a polarity of an optical fiber needs to be switched, the dual-core connector is switched from the first polarity state to a second polarity state. In this process, the shaft is rotated relative to the housing to release mutual locking between the shaft and the housing, so that the shaft can be pulled out from the one end that is of the through hole and that corresponds to the first surface. Then, the plug assembly is turned over. The shaft is inserted into one end that is of the through hole and that corresponds to the second surface, and is rotated relative to the housing to the locking position. In this case, the shaft and the housing lock each other. The clamping component is located on one side of the second surface of the housing, the clamping assembly and the plug assembly are installed together, and the dual-core connector is in the second polarity state.

In other words, when the dual-core connector is switched between the first polarity state and the second polarity state, it is only needed to turn over the housing and pull the shaft out from one end of the through hole, insert the shaft into the other end of the through hole, and rotate the shaft to the locking position. The entire process is simple and does not require complex operations.

In an implementation of this application, when the shaft is located on the first surface of the housing, the shaft and the one end that is of the through hole and that penetrates the first surface are detachably installed together, to implement mutual locking and unlocking between the shaft and the housing. This case corresponds to the first polarity state of the dual-core connector. When the shaft is located on the second surface of the housing, the shaft and the one end that is of the through hole and that penetrates the second surface are detachably installed together, to implement mutual locking and unlocking between the shaft and the housing. This case corresponds to the second polarity state of the dual-core connector.

In an implementation of this application, an inner circumferential wall of the through hole has several first protrusions, and two side surfaces of the first protrusion have a same distance from the housing. An outer circumferential wall of the shaft has several second protrusions, and the second protrusions are located on one end that is of the shaft and that is away from the clamping component. The second protrusion is configured to fit with the first protrusion. When the shaft is located in the locking position, a side face that is of the second protrusion and that faces the clamping component abuts against a side face that is of the first protrusion and that is away from the clamping component, so that the shaft is locked in the through hole in an axial direction. In other words, mutual locking between the shaft and the housing is implemented.

In an implementation of this application, there are at least two first protrusions, and the first protrusions are spaced along a circumferential direction of the through hole. In addition, in the circumferential direction of the through hole, a spacing between two adjacent first protrusions is greater than a size of the second protrusion, to ensure that after the shaft and the housing are unlocked, the second protrusion can pass between the two adjacent first protrusions. This implements removal and insertion of the shaft in the through hole.

In an implementation of this application, there are at least two second protrusions, and the second protrusions are spaced along a circumferential direction of the shaft. In addition, in the circumferential direction of the shaft, a spacing between two adjacent second protrusions is greater than a size of the first protrusion, to ensure that after the shaft and the housing are unlocked, the first protrusion can pass between the two adjacent second protrusions. This implements removal and insertion of the shaft in the through hole.

In an implementation of this application, a top surface of the first protrusion is a concave arc shape, and the top surface of the first protrusion is in sliding fit with the outer circumferential wall of the shaft. In such a design, in a process in which the shaft is rotated in the through hole, mutual sliding friction between the outer circumferential wall of the shaft and the top surface of the first protrusion can implement a guiding function, so that rotation of the shaft is more stable.

In an implementation of this application, the outer circumferential wall of the shaft has an outer flange. The outer flange is located on an end that is of the shaft and that is close to the clamping component, so that a gap is formed between the outer flange and the second protrusion. The first protrusion is sandwiched in the gap, to enable the shaft and the housing to lock each other more stably in an axial direction of the shaft.

In an implementation of this application, the dual-core connector further includes a positioning assembly. The positioning assembly is located on the housing and the clamping component. When the shaft and the housing lock each other, the positioning assembly can prevent the housing and the clamping component from rotating relative to each other. In such a design, after the shaft and the housing lock each other, unnecessary rotation does not occur and accidental unlocking between the shaft and the housing is further avoided. In addition, in a process of rotating the shaft, a user can learn that the shaft and the housing lock each other. This avoids excessive rotation of the shaft by the user. In other words, the positioning assembly improves reliability of the dual-core connector and operability of the dual-core connector.

In an implementation of this application, the positioning assembly includes a first positioning component and two second positioning components. The first positioning component is connected to a surface that is of the clamping component and that is close to the housing. One of the two second positioning components is connected to the first surface, and the other of the two second positioning components is connected to the second surface. The two second positioning components are both located on a rotation track of the first positioning component. When the shaft and the housing lock each other, one of the two second positioning components is clamped to the first positioning component. In other words, when the dual-core connector is in the first polarity state, if the shaft and the housing lock each other, the first positioning component is clamped to the second positioning component that is located on the first surface. When the dual-core connector is in the second polarity state, if the shaft and the housing lock each other, the first positioning component is clamped to the second positioning component that is located on the second surface.

In an implementation of this application, the housing includes a sleeve and a socket. The sleeve is sleeved outside the socket. One end of each ferrule is inserted into the socket, and the other end of each ferrule is inserted into the sleeve. In such a design, the ferrule can be installed based on the sleeve and the socket, so that the ferrule is accommodated in the sleeve and the socket.

In an implementation of this application, two opposite outer walls of the sleeve each have a jack, and the two jacks are opposite to each other. The socket has an insertion cylinder inside. The insertion cylinder is located between the two jacks. One end of the insertion cylinder is opposite to and connected to one jack, and the other end of the insertion cylinder is opposite to and connected to the other jack. The insertion cylinder and the two jacks form the through hole. The two jacks are respectively located on the two opposite outer walls of the sleeve. This is equivalent to that the jacks penetrate the sleeve, and the insertion cylinder penetrates the socket. Therefore, the through hole formed by the insertion cylinder and the two jacks penetrates the housing, so that two ends of the through hole respectively penetrate the first surface and the second surface.

In an implementation of this application, the clamping component includes a bottom plate and a cantilever. A plate surface of the bottom plate is connected to the shaft. The cantilever is located on a side that is of the bottom plate and that is away from the shaft. The cantilever includes a fixed end and a free end. The fixed end of the cantilever is connected to the bottom plate, the free end of the cantilever is spaced from the bottom plate, and the free end of the cantilever has a clamping protrusion. In such a design, the bottom plate provides an installation basis for the cantilever. Because the free end of the cantilever is spaced from the bottom plate, the free end of the cantilever can move relative to the bottom plate under pressure, to drive the clamping protrusion to move. This implements unlocking between the cantilever and the adapter.

In an implementation of this application, the dual-core connector further includes a releasing rod. One end of the releasing rod is movably sleeved on the cantilever along a length direction of the cantilever. When moving towards the fixed end of the cantilever, the releasing rod can drive the free end of the cantilever to move towards the bottom plate, so that the clamping protrusion on the free end of the cantilever moves at the same time. This implements unlocking between the cantilever and the adapter. In such a design, remote unlocking can be implemented through the releasing rod, and the cantilever does not need to be directly pressed, so that the cantilever is unlocked in narrow space.

In an implementation of this application, the releasing rod includes a substrate, a wedge, and two outer side plates. The two outer side plates are respectively connected to two side edges of the substrate that are perpendicular to a length direction of the substrate, and the two outer side plates are respectively in sliding fit with two side edges of the bottom plate. The wedge is located on an end of the substrate in the length direction, and the wedge and the outer side plates are located on a same side of the substrate. An oblique surface of the wedge is in sliding contact with the free end of the cantilever. In this design, the substrate supports the wedge and the two outer side plates. The two outer side plates are in sliding fit with each other respectively on two side edges of the bottom plate to implement a guiding function, so that the releasing rod can always slide along a length direction of the bottom plate. In a process in which the releasing rod moves, the oblique surface of the wedge presses the free end of the cantilever to drive the free end of the cantilever to move towards the bottom plate, so that the clamping protrusion on the free end of the cantilever moves at the same time. This implements unlocking between the cantilever and the adapter.

In an implementation of this application, an inner side surface of the outer side plate has a first sliding strip, and the first sliding strip extends along the length direction of the substrate. The two side edges of the bottom plate that are perpendicular to the length direction of the bottom plate each have a first sliding slot. The first sliding slot extends along the length direction of the bottom plate, and the first sliding strip is slidably inserted into the corresponding first sliding slot, so that guidance of the releasing rod when the releasing rod slides relative to the cantilever is implemented through sliding fit between the first sliding slot and the first sliding strip.

In an implementation of this application, the releasing rod further includes two inner side plates. The two inner side plates are located between the two outer side plates, and are both parallel to the outer side plates. The clamping component further includes a guiding rib. The guiding rib and the cantilever are located on a same side of the bottom plate, and the guiding rib is connected to the bottom plate. The guiding rib extends along the length direction of the bottom plate, the guiding rib is inserted between the two inner side plates, and the guiding rib and the two inner side plates are in sliding fit with each other. The guiding rib and the two inner side plates are in sliding fit. This implements guidance of the releasing rod when the releasing rod slides relative to the cantilever.

In an implementation of this application, an inner side surface of the inner side plate has a second sliding strip, and the second sliding strip extends along the length direction of the substrate. Two side surfaces of the guiding rib that are perpendicular to a length direction of the guiding rib each have a second sliding slot. The second sliding slot extends along the length direction of the guiding rib, and the second sliding strip is slidably inserted into the corresponding second sliding slot, so that guidance of the releasing rod when the releasing rod slides relative to the cantilever is implemented through the sliding fit between the second sliding slot and the second sliding strip.

In an implementation of this application, one end that is of the releasing rod and that is away from the cantilever has a label region. In other words, the end that is of the releasing rod and that is away from the cantilever has a specific area, and can accommodate the label region. A label is set in the label region. This facilitates querying related information.

According to a second aspect, a connection system is provided, where the connection system includes a dual-core connector and an adapter. The dual-core connector is the foregoing dual-core connector. The dual-core connector is inserted into the adapter, and the dual-core connector and the adapter are clamped to each other through a clamping component.

The connection system provided in this embodiment of this application has at least the following effects.

When the connection system provided in this embodiment of this application is used, different optical fibers are respectively inserted into ferrules of the dual-core connector. The dual-core connector has a first polarity state and a second polarity state, and can be freely switched between the first polarity state and the second polarity state. Therefore, when the dual-core connector is inserted into the adapter in the first polarity state, the optical fiber can work in one polarity, and when the dual-core connector is inserted into the adapter in the second polarity state, the optical fiber can work in the other polarity. This implements quick switching of optical fiber polarities through the dual-core connector.

REFERENCE NUMERALS

- 1: Plug assembly;
- 11: Housing; 11*a*: Through hole; 11*b*: First surface; 11*c*: Second surface; 111: Sleeve; 1111: Connecting sleeve; 1111*a*: Jack; 1112: Tube sleeve; 112: Socket; 1121: Connecting socket; 1121*a*: Insertion cylinder; 1122: Tube socket; 113: First protrusion;
- 12: Ferrule;
- 2: Clamping assembly;
- 21: Clamping component; 212: Bottom plate; 2121: First sliding slot; 213: Cantilever; 2131: Clamping protrusion; 214: Guiding rib; 2141: Second sliding slot;
- 22: Shaft; 221: Second protrusion; 222: Outer flange; 223: Gap;
- 3: Releasing rod; 3*a*: Label region; 31: Substrate; 32: Wedge; 33: Outer side plate; 331: First sliding strip; 34: Inner side plate; 341: Second sliding strip;
- 4: Positioning assembly; 41: First positioning component; 42: Second positioning component;
- 100: Dual-core connector; 200: Adapter.

DESCRIPTION OF EMBODIMENTS

Terms used in an implementation part of this application are merely used to explain embodiments of this application, and are not intended to limit this application.

A dual-core connector is a common optical fiber connector, and is applicable to duplex communication.

In a conventional technology, the dual-core connector mainly includes a housing and two ferrules. The housing is configured to clamp to an adapter. The two ferrules are detachably arranged in parallel in the housing, and are configured to respectively connect two different optical fibers. After the dual-core connector and the adapter are clamped together, the two ferrules respectively correspond to two different sockets of the adapter. In this way, an optical fiber connected to one ferrule can transmit a signal in one direction, and an optical fiber connected to the other ferrule can transmit a signal in an opposite direction. This implements duplex communication.

However, when polarities (signal transmission directions) of the two optical fibers are switched, the two ferrules need to be disassembled from the housing, positions of the two ferrules need to be switched, and then the two ferrules are reinstalled into the housing. This process is very complex.

Figure 1:
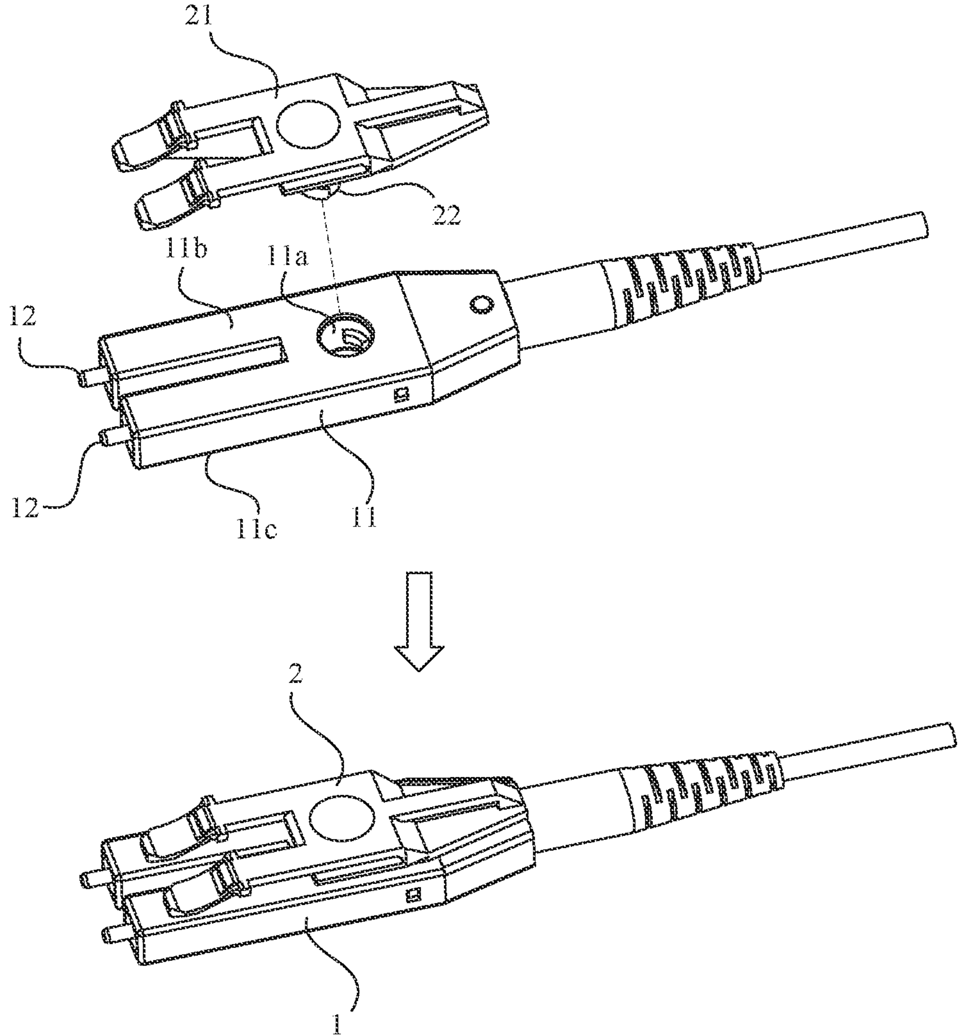
FIG. 1 is an exploded view of a dual-core connector.

To resolve the foregoing technical problem, an embodiment of this application provides a dual-core connector. FIG. 1 is a schematic structural diagram of the dual-core connector. Refer to FIG. 1. The dual-core connector includes a plug assembly 1 and a clamping assembly 2.

The plug assembly 1 includes a housing 11 and at least two ferrules 12. The housing 11 has a through hole 11*a*, and the through hole 11*a* penetrates a first surface 11*b* and a second surface 11*c* that are of the housing 11 and that are opposite to each other. The ferrules 12 are located in the housing 11 and extend along a length direction of the housing 11, and axes of the ferrules 12 are respectively located on two sides of the through hole 11*a*. The clamping assembly 2 includes a clamping component 21 and a shaft 22. One end of the shaft 22 is connected to the clamping component 21, and the other end of the shaft 22 is rotatably connected in the through hole 11*a*. When the shaft 22 is rotated relative to the housing 11 to a locking position, the shaft 22 and the housing 11 can lock each other.

Figure 2:
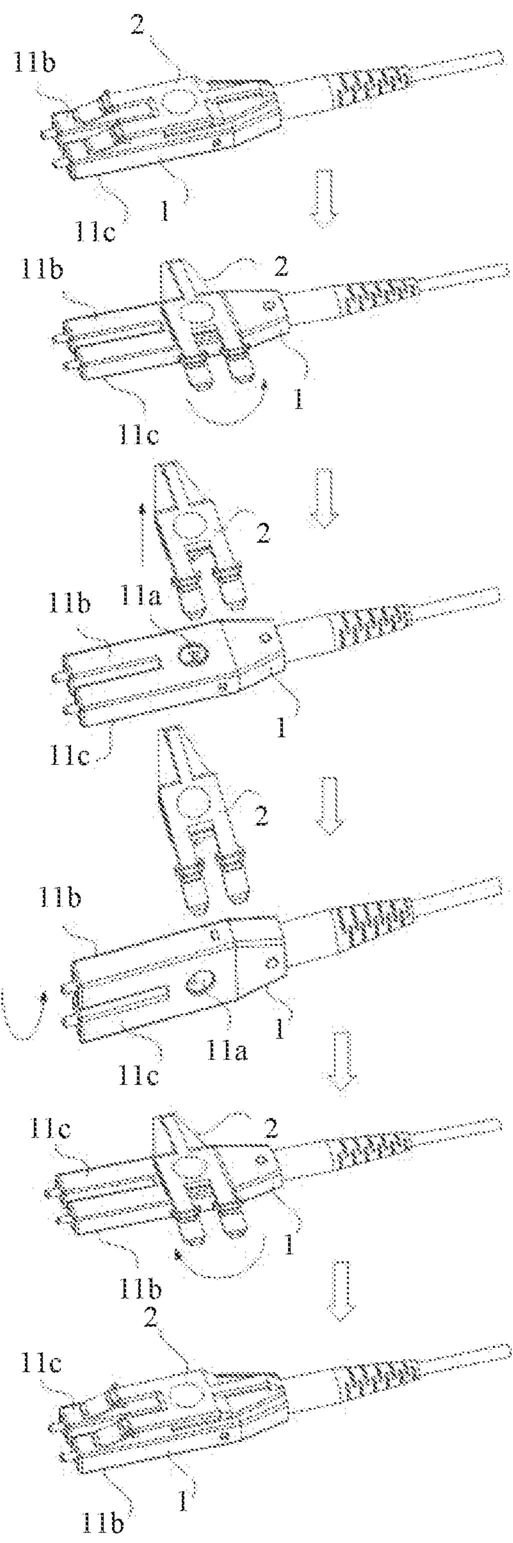
FIG. 2 is a schematic diagram of polarity switching of a dual-core connector.

FIG. 2 is a schematic diagram of polarity switching of the dual-core connector. With reference to FIG. 2, when the dual-core connector provided in this embodiment of this application is used, different optical fibers are inserted into the ferrules 12. Because the optical fiber has two polarities, the dual-core connector correspondingly has a first polarity state and a second polarity state. When the dual-core connector is in the first polarity state, the optical fiber is in a first polarity. When the dual-core connector switches to the second polarity state, the optical fiber correspondingly switches to a second polarity.

The shaft 22 is inserted into one end that is of the through hole 11*a* and that corresponds to the first surface 11*b*, and is rotated relative to the housing 11 to a locking position. In this case, the shaft 22 and the housing 11 lock each other. The clamping component 21 is located on one side of the first surface 11*b* of the housing 11, the clamping assembly 2 and the plug assembly 1 are installed together, and the dual-core connector is in the first polarity state. When the polarity of the optical fiber needs to be switched, the dual-core connector is switched from the first polarity state to the second polarity state. In this process, the shaft 22 is rotated relative to the housing 11 to release mutual locking between the shaft 22 and the housing 11, so that the shaft 22 can be pulled out from the one end that is of the through hole 11*a* and that corresponds to the first surface 11*b*. Then, the plug assembly 1 is turned over, and the shaft 22 is inserted into one end that is of the through hole 11*a* and that corresponds to the second surface 11*c*, and is rotated relative to the housing 11 to a locking position. In this case, the shaft 22 and the housing 11 lock each other, the clamping component 21 is located on one side of the second surface 11*c* of the housing 11, and the clamping assembly 2 and the plug assembly 1 are installed together. The dual-core connector is in the second polarity state.

In other words, when the dual-core connector is switched between the first polarity state and the second polarity state, it is only needed to turn over the housing 11 and pull the shaft 22 out from one end of the through hole 11*a*, insert the shaft 22 into the other end of the through hole 11*a*, and rotate the shaft 22 to the locking position. The entire process is simple and does not require complex operations.

It should be noted that although only two ferrules 12 are shown in FIG. 1 and FIG. 2, in another embodiment, a quantity of ferrules 12 can be selected based on an actual requirement, for example, three or four. This is not limited in this application.

It can be learned from the foregoing that a polarity switching process of the dual-core connector provided in this embodiment of this application is very simple because the housing does not need to be disassembled, and the clamping assembly 2 only needs to be moved from one side of the first surface 11*b* of the plug assembly 1 to one side of the second surface 11*c* through a simple operation. The following further describes polarity switching of the dual-core connector.

Still refer to FIG. 2. In this embodiment, when the shaft 22 is located on one side of the first surface 11*b* of the housing 11, the shaft 22 is detachably inserted into the one end that is of the through hole 11*a* and that penetrates the first surface 11*b*. When the shaft 22 is inserted into the one end that is of the through hole 11*a* and that penetrates the first surface 11*b*, the dual-core connector is in the first polarity state. When the shaft 22 is inserted into the one end that is of the through hole 11*a* and that penetrates the first surface 11*b*, the dual-core connector is ready to switch from the second polarity state to the first polarity state. When the shaft 22 is pulled out from the one end that is of the through hole 11*a* and that penetrates the first surface 11*b*, the dual-core connector is switching from the first polarity state to the second polarity state.

When the shaft 22 is located on one side of the second surface 11*c* of the housing 11, the shaft 22 is detachably inserted into one end that is of the through hole 11*a* and that penetrates the second surface 11*c*. When the shaft 22 is inserted into the one end that is of the through hole 11*a* and that penetrates the second surface 11*c*, the dual-core connector is in the second polarity state. When the shaft 22 is inserted into the one end that is of the through hole 11*a* and that penetrates the second surface 11*c*, the dual-core connector is ready to switch from the first polarity state to the second polarity state. When the shaft 22 is pulled out from the one end that is of the through hole 11*a* and that penetrates the second surface 11*c*, the dual-core connector is switching from the second polarity state to the first polarity state.

In other words, polarity switching of the optical fiber connected to the ferrule 12 is implemented by turning over the housing 11. After the housing 11 is turned over, a position of the clamping component 21 relative to the housing 11 is correspondingly changed, and the shaft 22 is inserted into a corresponding end of the through hole 11*a*, to implement mutual locking between the shaft 22 and the housing 11. It can be learned that in the dual-core connector provided in this embodiment of this application, when the polarity of the optical fiber is switched, only two steps are needed. One is to turn over the plug assembly 1, and the other is to disassemble the clamping assembly 2 on the plug assembly 1, to correspondingly change an installation position of the clamping assembly 2 on the plug assembly 1.

The following describes a manner of assembling and disassembling the clamping assembly 2 and the plug assembly 1.

Figure 3:
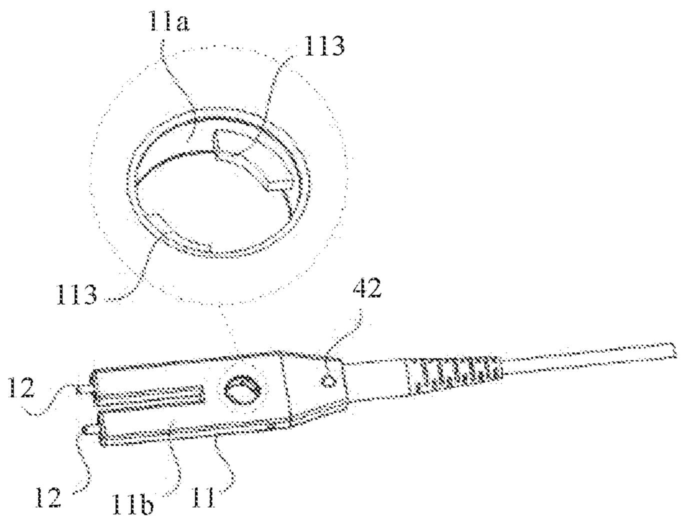
FIG. 3 is a schematic structural diagram of a plug assembly.

FIG. 3 is a schematic structural diagram of the plug assembly 1. An inner circumferential wall of the through hole 11*a* has several first protrusions 113, and two side surfaces of the first protrusion 113 have a same distance from the housing 11.

Figure 4:
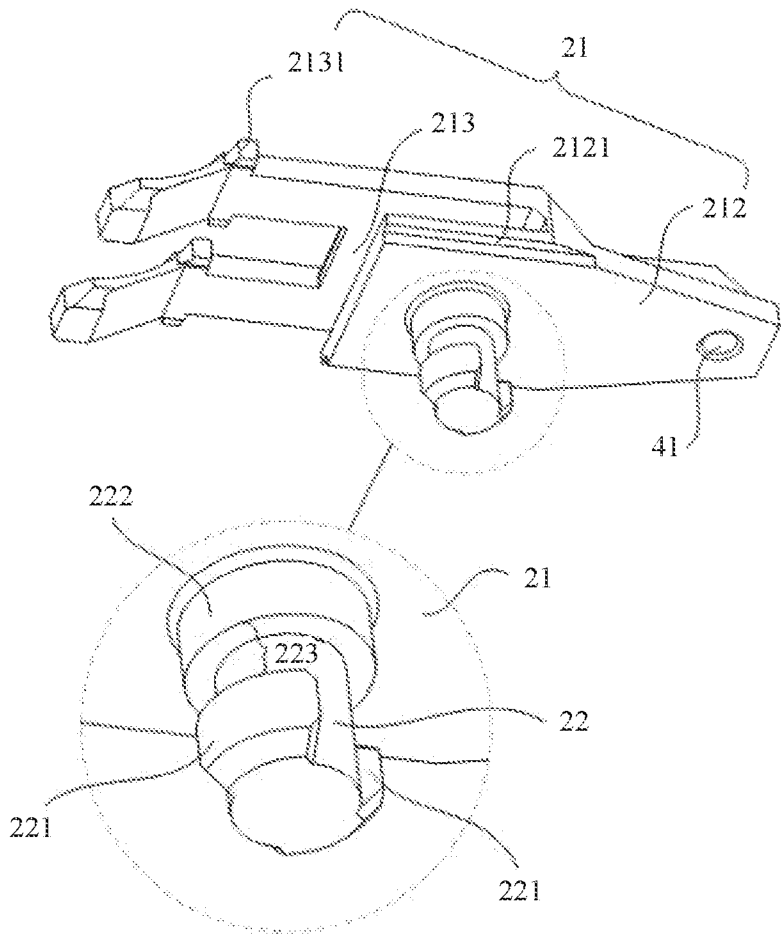
FIG. 4 is a schematic structural diagram of a clamping assembly.

FIG. 4 is a schematic structural diagram of the clamping assembly 2. An outer circumferential wall of the shaft 22 has several second protrusions 221, and the second protrusions

221 are located on one end that is of the shaft 22 that is away from the clamping component 21.

Figures 5, 6:
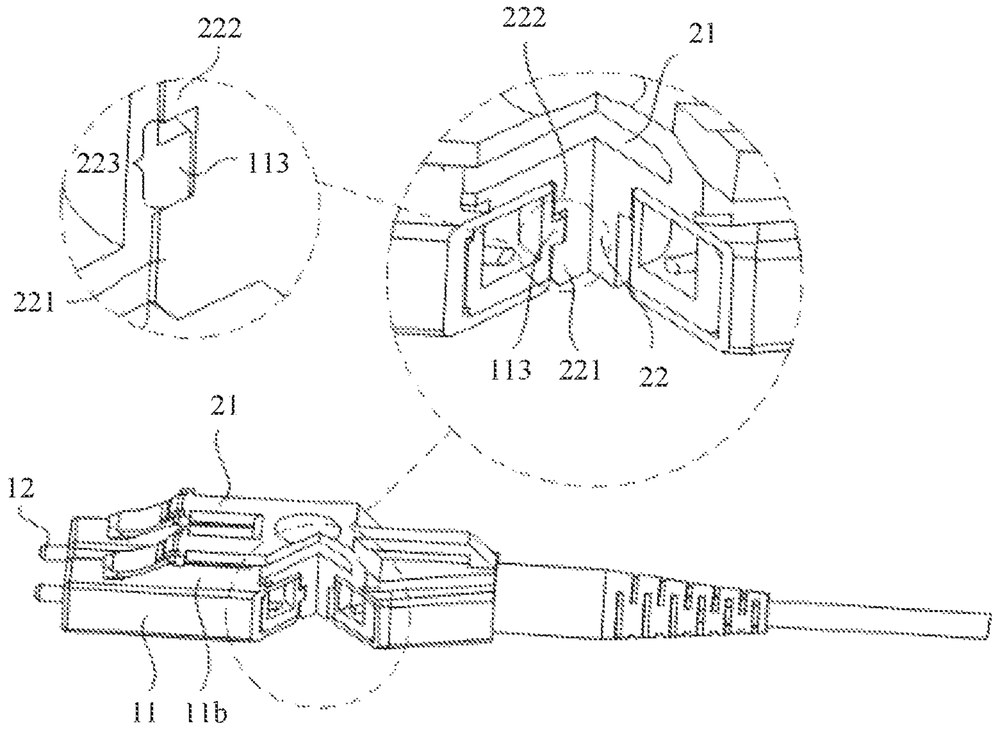
FIG. 5 is a schematic assembly diagram of a plug assembly and a clamping assembly.
FIG. 6 is a schematic assembly diagram of a shaft and a through hole.

FIG. 5 is a schematic assembly diagram of the plug assembly 1 and the clamping assembly 2. When the shaft 22 is located in the locking position, a side surface that is of the second protrusion 221 and that faces the clamping component 21 abuts against a side surface that is of the first protrusion 113 and that is away from the clamping component 21.

In the foregoing implementation, mutual locking between the shaft 22 and the housing 11 is implemented by mutual abutting between the first protrusion 113 and the second protrusion 221 in an axial direction of the shaft 22. The side face that is of the second protrusion 221 and that faces the clamping component 21 abuts against the side face that is of the first protrusion 113 and that is away from the clamping component 21. This can effectively prevent the shaft 22 from being pulled out from the through hole 11*a* in a locking state.

The following briefly describes a process of assembling and disassembling the clamping assembly 2 and the plug assembly 1.

The first protrusion 113 and the second protrusion 221 are staggered, so that the shaft 22 can be inserted into the through hole 11*a* along the axial direction. After the insertion is completed, the shaft 22 is rotated opposite to the housing 11, and the first protrusion 113 and the second protrusion 221 move accordingly. When the shaft 22 is rotated relative to the housing 11 to the locking position, the side face that is of the second protrusion 221 and that faces the clamping component 21 abuts against the side face that is of the first protrusion 113 and that is away from the clamping component 21. This implements mutual locking between the shaft 22 and the housing 11. In this way, the process of installing the clamping assembly 2 on the plug assembly 1 is completed.

The shaft 22 is rotated relative to the housing 11, and in the rotation process, a specific force is applied on the shaft 22 in a direction of pulling out the shaft 22. As the shaft 22 is rotated, the first protrusion 113 and the second protrusion 221 move accordingly. When the first protrusion 113 and the second protrusion 221 are staggered again, the shaft 22 and the housing 11 are unlocked, and the shaft 22 is pulled out of the through hole 11*a* by the foregoing force. In this way, the process of disassembling the clamping assembly 2 on the plug assembly 1 is completed.

It should be noted that a process of assembling and disassembling the shaft 22 on the one end that is of the through hole 11*a* and that penetrates the first surface 11*b* is the same as a process of assembling and disassembling the shaft 22 on the one end that is of the through hole 11*a* and penetrates the second surface 11*c*. In this way, convenience of user operations is improved, and learning costs are reduced.

Still refer to FIG. 3 to FIG. 5. In this embodiment, there are at least two first protrusions 113, and the first protrusions 113 are spaced along a circumferential direction of the through hole 11*a*. In the circumferential direction of the through hole 11*a*, a spacing between two adjacent first protrusions 113 is greater than a size of the second protrusion 221, to ensure that after the shaft 22 and the housing 11 are unlocked, the second protrusion 221 can pass between the two adjacent first protrusions 113. This implements removal and insertion of the shaft 22 in the through hole 11*a*.

There are at least two second protrusions 221, and the second protrusions 221 are spaced along a circumferential direction of the shaft 22. In addition, in the circumferential direction of the shaft 22, a spacing between two adjacent second protrusions 221 is greater than a size of the first protrusion 113. This ensures that after the shaft 22 and the housing 11 are unlocked, the first protrusion 113 can pass between the two adjacent second protrusions 221. This implements removal and insertion of the shaft 22 in the through hole 11*a*.

A larger spacing between the two adjacent first protrusions 113 indicates that the second protrusion 221 is more likely to pass between the two adjacent first protrusions 113. However, a larger spacing between the two adjacent first protrusions 113 also limits the size of the first protrusion 113, and affects an abutting area between the first protrusion 113 and the second protrusion 221. The spacing between the two adjacent second protrusions 221 is in the similar situation. To balance the foregoing two points, optionally, in the circumferential direction of the through hole 11*a*, the spacing between the two adjacent first protrusions 113 is equal to the size of the second protrusion 221, and the spacing between the two adjacent second protrusions 221 is equal to the size of the first protrusion 113. If the size of the first protrusion 113 is the same as the size of the second protrusion 221, the spacing between the two adjacent first protrusions 113 is also the same as the spacing between the two adjacent second protrusions 221.

Optionally, a quantity of the first protrusions 113 is in a one-to-one correspondence with a quantity of the second protrusions 221. The first protrusions 113 are spaced at an equal spacing along the circumferential direction of the through hole 11*a*. The second protrusions 221 are spaced at an equal spacing along the circumferential direction of the shaft 22. In other words, the first protrusions 113 are symmetrically arranged relative to an axis of the through hole 11*a*, and the second protrusions 221 are symmetrically arranged relative to an axis of the shaft 22. In such a design, when the shaft 22 and the housing 11 lock each other, the first protrusion 113 and the second protrusion 221 can be in a one-to-one correspondence, so that the locking is more stable.

FIG. 6 is a schematic assembly diagram of the shaft 22 and the through hole 11*a*. With reference to FIG. 6, in this embodiment, a top surface of the first protrusion 113 is a concave arc surface, and the top surface of the first protrusion 113 is in sliding fit with the outer circumferential wall of the shaft 22.

The top face of the first protrusion 113 is a face that is of the first protrusion 113 and that faces the axis of the through hole 11*a*. In such a design, in a process in which the shaft 22 is rotated in the through hole 11*a*, mutual sliding friction between the outer circumferential wall of the shaft 22 and the top face of the first protrusion 113 can implement a guiding function, so that rotation of the shaft 22 is more stable.

Optionally, the first protrusion 113 and the second protrusion 221 are in sector structures. The top surface of the first protrusion 113 is a concave arc surface and is in sliding fit with the outer circumferential wall of the shaft 22, and a top surface of the second protrusion 221 is a convex arc surface and is in sliding fit with the inner circumferential wall of the through hole 11*a*, so that both the first protrusion 113 and the second protrusion 221 can implement the guiding function. This further improves stability of the shaft 22 when the shaft 22 is rotated relative to the housing 11.

Refer to FIG. 4. To facilitate insertion of the shaft 22 into the through hole 11*a*, a side surface that is of the second protrusion 221 and that is away from the clamping component 21 has a chamfer. The chamfer can provide a guiding function in a process of inserting the shaft 22 into the through hole 11*a*, to prevent the insertion of the shaft 22 into the through hole 11*a* from being affected by the second protrusion 221 protruding from the outer circumferential wall of the shaft 22.

In this embodiment, the outer circumferential wall of the shaft 22 has an outer flange 222. The outer flange 222 is close to the clamping component 21. There is a gap 223 between the outer flange 222 and the second protrusion 221, and the first protrusion 113 is sandwiched in the gap 223.

In the foregoing implementation, when the shaft 22 and the housing 11 lock each other, the gap 223 provides accommodation space for the first protrusion 113, and limits the first protrusion 113 in the axial direction of the shaft 22, to avoid unnecessary shaking in the through hole 11*a* after the shaft 22 is inserted into the through hole 11*a*.

Locking and unlocking of the shaft 22 and the housing 11 through rotation may be implemented in other manners in other embodiments in addition to fit between the first protrusion 113 and the second protrusion 221 in the foregoing implementation. For example, the outer circumferential wall of the shaft 22 has an external thread, and an inner circumferential wall of the housing 11 has an internal thread. The shaft 22 is threadedly fitted with the housing 11.

To lock the shaft 22 and the housing 11, the shaft 22 is rotated relative to the housing 11 in a first direction until the shaft 22 is rotated to the locking position, and the shaft 22 and the housing 11 are locked through threaded fitting. To unlock the shaft 22 and the housing 11, the shaft 22 is rotated relative to the housing 11 in a second direction (opposite to the first direction) until the shaft 22 is separated from the housing 11, to complete the unlocking.

Axial locking between the shaft 22 and the housing 11 is described above, and circumferential locking between the shaft 22 and the housing 11 is described below.

Figure 7:
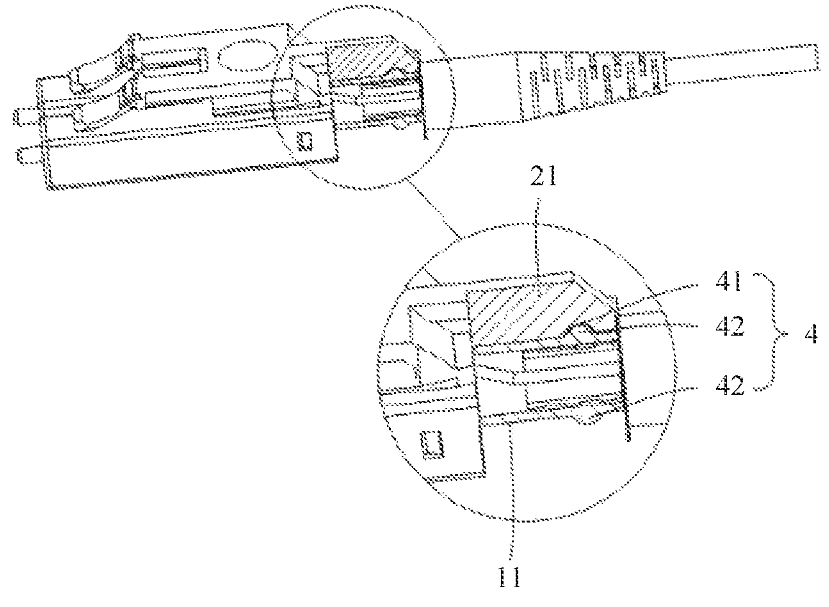
FIG. 7 is a partial sectional view of a dual-core connector.

FIG. 7 is a partial sectional view of the dual-core connector. With reference to FIG. 7, in this embodiment, the dual-core connector further includes a positioning assembly 4. The positioning assembly 4 is located on the housing 11 and the clamping component 21. The positioning assembly 4 is configured to prevent relative rotation of the housing 11 and the clamping component 21 when the shaft 22 and the housing 11 lock each other.

In such a design, after the shaft 22 and the housing 11 lock each other, unnecessary rotation does not occur and accidental unlocking between the shaft 22 and the housing 11 is further avoided. In addition, in a process of rotating the shaft 22, a user can learn that the shaft 22 and the housing 11 lock each other. This avoids excessive rotation of the shaft by the user. In other words, the positioning assembly improves reliability of the dual-core connector and operability of the dual-core connector.

Optionally, the positioning assembly 4 includes a first positioning component 41 and two second positioning components 42. The first positioning component 41 is connected to a surface that is of the clamping component 21 and that is close to the housing 11. One of the two second positioning components 42 is connected to the first surface 11*b*, and the other of the two second positioning components 42 is connected to the second surface 11*c*. The two second positioning components 42 are both located on a rotation track of the first positioning component 41. When the shaft 22 and the housing 11 lock each other, one of the two second positioning components 42 is clamped to the first positioning component 41.

In the foregoing implementation, when the dual-core connector is in the first polarity state, if the shaft 22 and the housing 11 lock each other, the first positioning component 41 is clamped to the second positioning component 42 that is located on the first surface 11*b*. When the dual-core connector is in the second polarity state, if the shaft 22 and the housing 11 lock each other, the first positioning component 41 is clamped to the second positioning component 42 that is located on the second surface 11*c*.

Optionally, the first positioning component 41 is a groove, and the two second positioning components 42 are protrusions. The second positioning components 42 are inserted into the first positioning component 41, to implement mutual clamping between the first positioning component 41 and the second positioning components 42. It is easy to understand that in another embodiment, the first positioning component 41 is a protrusion, and the two second positioning components 42 are grooves. In this way, a same clamping effect can also be implemented.

In this embodiment, when a length direction of the clamping component 21 is the same as a length direction of the housing 11, the shaft 22 is rotated to the locking position. In this way, the first positioning component 41 and the second positioning component 42 can be arranged in sufficient space, and the user can more intuitively observe whether the shaft 22 is about to rotate to the locking position. This can provide visual feedback for the user, and improves the operability of the dual-core connector.

The foregoing describes a structure of the shaft 22 of the clamping assembly 2 and a related assembly relationship. The following describes the clamping component 21 of the clamping assembly 2.

Figure 9:
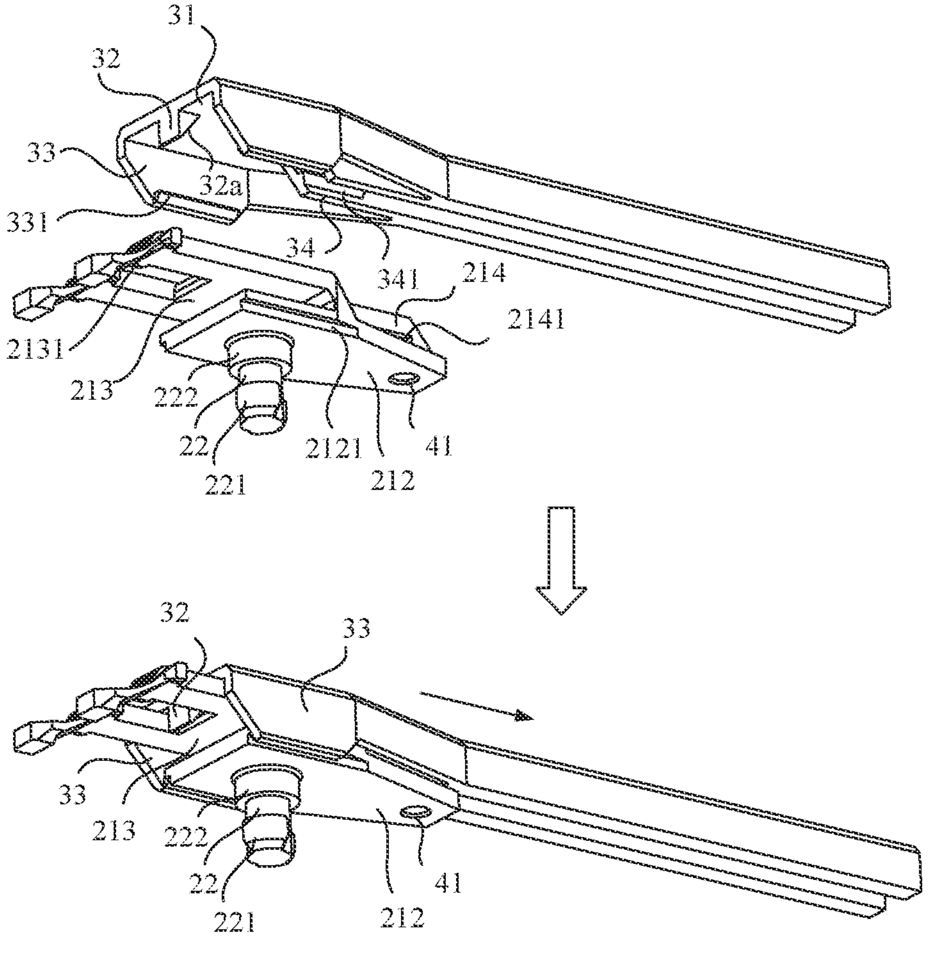
FIG. 9 is a schematic structural diagram of a clamping component.

FIG. 9 is a schematic structural diagram of a clamping component. With reference to FIG. 9, in this embodiment, the clamping component 21 includes a bottom plate 212 and a cantilever 213. A plate surface of the bottom plate 212 is connected to the shaft 22. A fixed end of the cantilever 213 is connected to the bottom plate 212, a free end of the cantilever 213 is spaced from the bottom plate 212, and the free end of the cantilever 213 has a clamping protrusion 2131.

The bottom plate 212 provides an installation basis for the cantilever 213. Because the free end of the cantilever 213 is spaced from the bottom plate 212, the free end of the cantilever 213 can move relative to the bottom plate 212 under pressure. Because the cantilever 213 has specific elasticity, after the pressure disappears, the cantilever 213 can automatically rebound to a position before the downward pressure. The clamping protrusion 2131 is configured to lock the adapter. When the clamping protrusion 2131 is in an initial position (an upper part in FIG. 10), the cantilever 213 is not pressed, and the clamping protrusion 2131 is locked with the adapter. After the clamping protrusion 2131 is driven by the pressed cantilever and moves towards the bottom plate 212 (refer to a lower part in FIG. 10), the clamping protrusion 2131 and the adapter are unlocked. That is, locking and unlocking between the clamping protrusion 2131 and the adapter can be implemented by pressing the cantilever 213.

Because the dual-core connector is usually located in a very narrow position after being inserted into the adapter, it is difficult for the user to press the cantilever. To resolve the foregoing problem, with reference to FIG. 9, in this embodiment, the dual-core connector further includes a releasing rod 3. It should be noted that to clearly show a structure of the releasing rod 3 close to one end of the cantilever 213, a structure of the releasing rod 3 away from the end of the cantilever 213 is omitted in FIG. 9 and FIG. 10.

One end of the releasing rod 3 is movably sleeved on the cantilever 213 along a length direction of the cantilever 213.

The releasing rod 3 is configured to drive, when moving towards the fixed end of the cantilever 213, the free end of the cantilever 213 to move towards the bottom plate 212, so that the clamping protrusion 2131 on the free end of the cantilever 213 moves at the same time. This implements unlocking between the cantilever 213 and the adapter.

In such a design, when the dual-core connector needs to be unlocked, the user extends the releasing rod 3 into narrow space to enable the free end of the cantilever 213 to be sleeved on the cantilever 213, and then pulls the releasing rod 3, so that the releasing rod 3 moves towards the fixed end of the cantilever 213, to drive the free end of the cantilever 213 to move towards the bottom plate 212, to implement remote unlocking. In other words, the user does not need to directly press the cantilever 213, so that the cantilever 213 is unlocked in the narrow space.

It should be noted that the releasing rod 3 can be inserted into the cantilever 213 when the dual-core connector needs to be unlocked, and can be always inserted into the cantilever 213 after the dual-core connector is unlocked and disassembled. When the releasing rod 3 is inserted into the cantilever 213, if the polarity state of the dual-core connector needs to be changed, the releasing rod 3 may alternatively be rotated with the clamping assembly 2 relative to the plug assembly 1 (refer to FIG. 11).

Figures 11, 12:
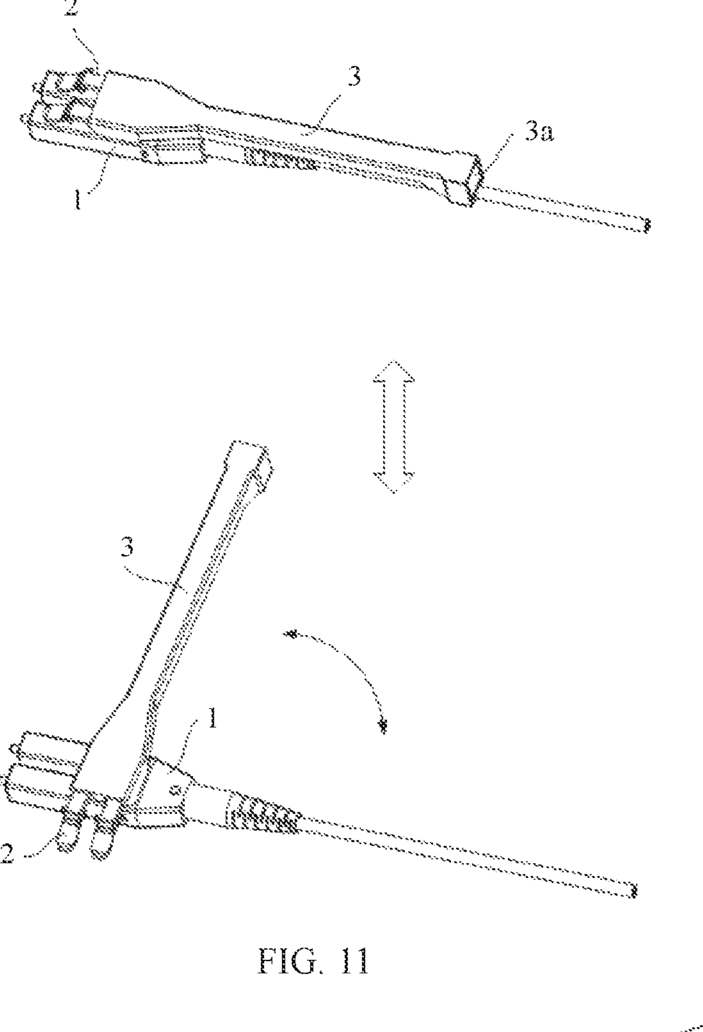
FIG. 11 is a schematic diagram of an action of a releasing rod.
FIG. 12 is a schematic structural diagram of a connection system.

Optionally, one end that is of the releasing rod 3 and that is away from the cantilever 213 has a label region 3*a* (refer to FIG. 11). A two-dimensional code can be set in the label region 3*a*, so that the user can query related information through the two-dimensional code.

It is easy to understand that a size of the label region 3*a* needs to be sufficient to accommodate the two-dimensional code, so that the two-dimensional code can be normally scanned. For example, the size of the label region 3*a* is not less than 4 mm*4 mm.

Figure 10:
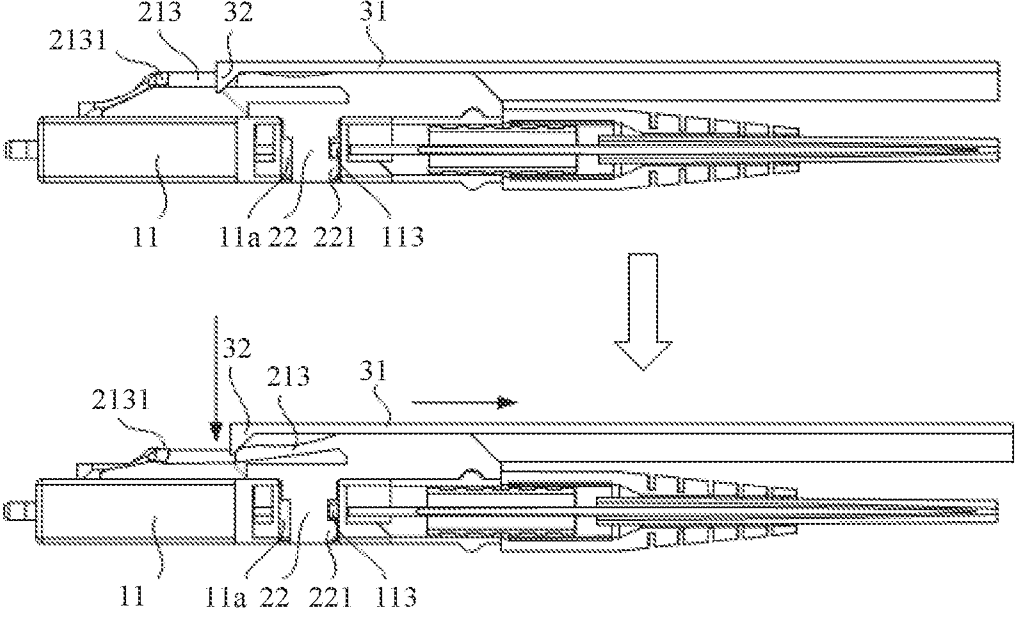
FIG. 10 is a schematic assembly diagram of a clamping component.

Still with reference to FIG. 9 and FIG. 10, optionally, the releasing rod 3 includes a substrate 31, a wedge 32, and two outer side plates 33.

Perpendicular to a length direction of the substrate 31, two side edges of the substrate 31 are respectively connected to the two outer side plates 33. The two outer side plates 33 are respectively in sliding fit with two side edges of the bottom plate 212. The wedge 32 is located on an end of the substrate 31 in the length direction, and is located on a same side of the substrate 31 as the two outer side plates 33. The wedge 32 is connected to the substrate 31, and an oblique surface 32*a* of the wedge 32 is in sliding contact with the free end of the cantilever 213.

In the foregoing implementation, the substrate 31 supports the wedge 32 and the two outer side plates 33. The two outer side plates 33 are respectively on and in sliding fit with the two side edges of the bottom plate 212, to implement a guiding function, so that the releasing rod 3 can always slide along a length direction of the bottom plate 212. In a process in which the releasing rod 3 moves, the oblique surface 32*a* of the wedge 32 presses the free end of the cantilever 213 to drive the free end of the cantilever 213 to move towards the bottom plate 212, so that the clamping protrusion 2131 on the free end of the cantilever 213 moves at the same time. This implements unlocking between the cantilever 213 and the adapter.

Optionally, an inner side face of the outer side plate 33 has a first sliding strip 331, and the first sliding strip 331 extends along the length direction of the substrate 31. Perpendicular to the length direction of the bottom plate 212, the two side edges of the bottom plate 212 each have a first sliding slot 2121. The first sliding slot 2121 extends along the length direction of the bottom plate 212, and the first sliding strip 331 is slidably inserted into the corresponding first sliding slot 2121.

Because the first sliding strip 331 is slidably inserted into the corresponding first sliding slot 2121, limiting between the first sliding strip 331 and the first sliding slot 2121 can ensure that the releasing rod 3 always slides along the extension direction of the first sliding slot 2121, that is, the length direction of the bottom plate 212, to implement guidance of the releasing rod 3 when the releasing rod 3 slides relative to the cantilever 213.

To further ensure that the releasing rod 3 can always move along the length direction of the cantilever 213 to implement accurate unlocking, in this embodiment, the releasing rod 3 further includes two inner side plates 34. The two inner side plates 34 are located between the two outer side plates 33, and are both parallel to the outer side plates 33. The clamping component 21 further includes a guiding rib 214. The guiding rib 214 and the cantilever 213 are located on a same side of the bottom plate 212, and the guiding rib is connected to the bottom plate 212. The guiding rib 214 extends along the length direction of the bottom plate 212. The guiding rib 214 is inserted between the two inner side plates 34, and the guiding rib 214 and the two inner side plates are in sliding fit with each other.

In the foregoing implementation, when the releasing rod 3 is sleeved on the cantilever 213 from the free end of the cantilever 213, the guiding rib 214 is also inserted between the two inner side plates 34. Because the guiding rib 214 extends along the length direction of the bottom plate 212, and the inner side plate 34 is parallel to the outer side plate 33, the releasing rod 3 can always slide along the length direction of the bottom plate 212 through the sliding fit between the guiding rib 214 and the inner side plate 34. This facilitates implementing accurate unlocking of the releasing rod 3.

Optionally, an inner side surface of the inner side plate 34 has a second sliding strip 341, and the second sliding strip 341 extends along the length direction of the substrate 31. Perpendicular to a length direction of the guiding rib 214, two side surfaces of the guiding rib 214 each have a second sliding slot 2141. The second sliding slot 2141 extends along the length direction of the guiding rib 214, and the second sliding strip 341 is slidably inserted into the corresponding second sliding slot 2141.

Because the second sliding strip 341 is slidably inserted into the corresponding second sliding slot 2141, limiting between the second sliding strip 341 and the second sliding slot 2141 can ensure that the releasing rod 3 always slides along the extension direction of the second sliding slot 2141, that is, the length direction of the bottom plate 212, to implement guidance of the releasing rod 3 when the releasing rod 3 slides relative to the cantilever 213.

The foregoing describes a structure of the clamping assembly 2 and a related assembly relationship. The following describes the plug assembly 1.

Figure 8:
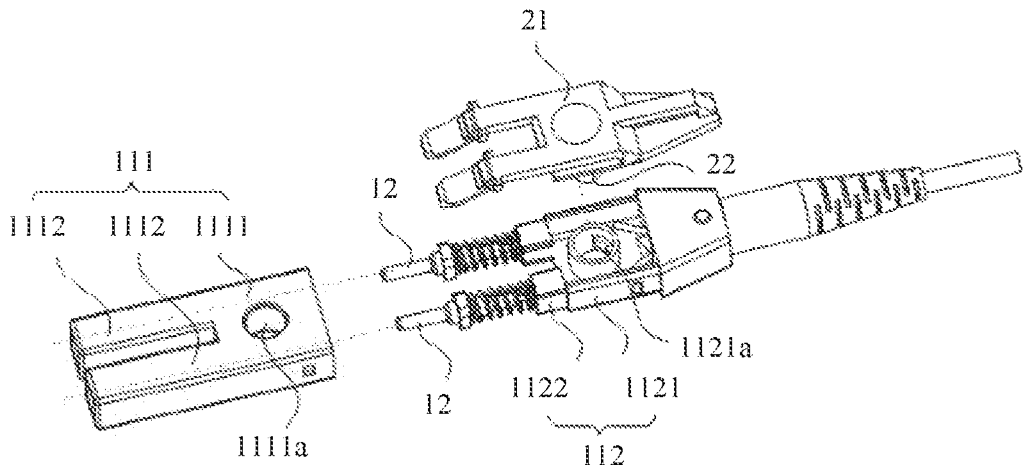
FIG. 8 is an exploded view of a dual-core connector.

FIG. 8 is an exploded view of the dual-core connector. With reference to FIG. 8, in this embodiment, the housing 11 includes a sleeve 111 and a socket 112.

The sleeve 111 is sleeved outside the socket 112. One end of each ferrule 12 is inserted into the socket 112, and the other end of each ferrule 12 is inserted into the sleeve 111.

In such a design, the ferrule can be installed based on the sleeve and the socket, so that the ferrule is accommodated in the sleeve and the socket.

Optionally, both the sleeve 111 and the socket 112 are in a centrosymmetric structure, so that the housing 11 can also maintain a same posture after being turned over. This facilitates design of an overall structure of the housing 11.

Optionally, the sleeve 111 includes a connecting sleeve 1111 and two tube sleeves 1112. The two tube sleeves 1112 are parallel to each other. The two tube sleeves 1112 are both connected to a same side of the connecting sleeve 1111 and are both connected to the connecting sleeve 1111.

The socket 112 includes a connecting socket 1121 and two tube sockets 1122. The two tube sockets 1122 are parallel to each other, one end of each of the two tube sockets 1122 is connected to a same side of the connecting socket 1121, and the other end is inserted into a corresponding tube sleeve 1112.

The two tube sleeves 1112 respectively correspond to the two ferrules 12, to provide accommodation space and an installation basis for the two ferrules 12. Similarly, the two tube sockets 1122 respectively correspond to the two ferrules 12, to provide the accommodation space and the installation basis for the two ferrules 12. The connecting sleeve 1111 and the connecting socket 1121 provide a basis for the through hole 11*a*.

Optionally, two opposite outer walls of the sleeve 111 each have a jack 1111*a*, and the two jacks 1111*a* are opposite to each other. The socket 112 has an insertion cylinder 1121*a* inside. The insertion cylinder 1121*a* is located between the two jacks 1111*a*. Two ends of the insertion cylinder 1121*a* are respectively opposite to and connected to the two jacks 1111*a*, to form the through hole 11*a*.

In the foregoing implementation, the jacks 1111*a* are respectively located on two sides of the connecting sleeve 1111, and respectively correspond to the first surface 11*b* and the second surface 11*c*. The insertion cylinder 1121*a* is located in the connecting socket 1121. The two jacks 1111*a* are respectively located on the two opposite outer walls of the sleeve 111. This is equivalent to that the jacks 1111*a* penetrate the sleeve 111 and the insertion cylinder 1121*a* penetrates the socket 112. Therefore, the through hole 11*a* formed by the insertion cylinder 1121*a* and the two jacks 1111*a* penetrates the housing 11, so that two ends of the through hole 11*a* respectively penetrate the first surface 11*b* and the second surface 11*c*. In this way, the shaft 22 can not only be inserted into the through hole 11*a* when the dual-core connector is in the first polarity state, but also be inserted into the through hole 11*a* when the dual-core connector is in the second polarity state.

FIG. 12 is a schematic structural diagram of a connection system. Refer to FIG. 12. The connection system includes a dual-core connector 100 and an adapter 200. The dual-core connector 100 is the dual-core connector shown in FIG. 1 to FIG. 11. The dual-core connector 100 is inserted into the adapter 200, and the dual-core connector and the adapter 200 are clamped to each other through a clamping component 21.

When the connection system provided in this embodiment of this application is used, different optical fibers are respectively inserted into ferrules of the dual-core connector 100. The dual-core connector 100 has a first polarity state and a second polarity state, and can be freely switched between the first polarity state and the second polarity state. Therefore, when the dual-core connector 100 is inserted into the adapter 200 in the first polarity state, the optical fiber can work in one polarity, and when the dual-core connector 100 is inserted into the adapter 200 in the second polarity state, the optical fiber can work in the other polarity. This implements quick switching of optical fiber polarities through the dual-core connector.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A dual-core connector, comprising a plug assembly and a clamping assembly, wherein the plug assembly comprises a housing and at least two ferrules, wherein the housing has a through hole penetrating through a first surface and a second surface of the housing that are opposite to each other, the at least two ferrules are located in the housing and extend along a length direction of the housing, and axes of the ferrules are respectively located on two sides of the through hole; and the clamping assembly comprises a clamping component and a shaft, wherein one end of the shaft is connected to the clamping component, the other end of the shaft is rotatably connected in the through hole, and wherein the shaft is rotatable relative to the housing to a locking position for the shaft and the housing to lock each other.

2. The dual-core connector according to claim 1, wherein when the shaft is located on one side of the first surface of the housing, the shaft is detachably inserted into one end of the through hole and penetrates the first surface; and when the shaft is located on one side of the second surface of the housing, the shaft is detachably inserted into one end of the through hole and penetrates the second surface.

3. The dual-core connector according to claim 1, wherein an inner circumferential wall of the through hole has one or more first protrusions, and two side surfaces of each of the first protrusions have a same distance from the housing;

an outer circumferential wall of the shaft has one or more second protrusions, and the second protrusions are located on one end of the shaft away from the clamping component; and when the shaft is in the locking position, a side face of the second protrusion facing the clamping component abuts against one side face of the first protrusion away from the clamping component.

4. The dual-core connector according to claim 3, wherein there are at least two first protrusions, the at least two first protrusions are spaced along a circumferential direction of the through hole and in the circumferential direction of the through hole, a spacing between two adjacent ones of the at least two first protrusions is greater than a size of a second protrusion of the one or more second protrusions.

5. The dual-core connector according to claim 3, wherein there are at least two second protrusions, the second protrusions are spaced along a circumferential direction of the shaft and in the circumferential direction of the shaft, a spacing between two adjacent ones of the at least two second protrusions is greater than a size of a first protrusion of the one or more first protrusions.

6. The dual-core connector according to claim 3, wherein a top surface of each of the one or more first protrusions is a concave arc surface in sliding fit with the outer circumferential wall of the shaft.

7. The dual-core connector according to claim 3, wherein the outer circumferential wall of the shaft has an outer flange close to the clamping component, and a first protrusion of the one or more first protrusions is sandwiched in a gap between the outer flange and a second protrusion of the one or more second protrusions.

8. The dual-core connector according to claim 1, wherein the dual-core connector further comprises a positioning assembly located on the housing and the clamping component, and the positioning assembly is configured to prevent, when the shaft and the housing lock each other, the housing and the clamping component from rotating relative to each other.

9. The dual-core connector according to claim 8, wherein:

the positioning assembly comprises a first positioning component and two second positioning components;

the first positioning component is connected to a surface of the clamping component close to the housing;

one of the two second positioning components is connected to the first surface, and the other one of the two second positioning components is connected to the second surface; and the two second positioning components are both located on a rotation track of the first positioning component, and when the shaft and the housing lock each other, one of the two second positioning components is clamped to the first positioning component.

10. The dual-core connector according to claim 1, wherein:

the housing comprises a sleeve and a socket;

the sleeve is sleeved outside the socket; and one end of each of the at least two ferrules is inserted into the socket, and the other end of each of the ferrules is inserted into the sleeve.

11. The dual-core connector according to claim 10, wherein two opposite outer walls of the sleeve each has a jack, and the two jacks are opposite to each other; and wherein the socket has an insertion cylinder inside, wherein the insertion cylinder is located between the two jacks, and two ends of the insertion cylinder are respectively opposite to and connected to the two jacks to form the through hole.

12. The dual-core connector according to claim 1, wherein:

the clamping component comprises a bottom plate and a cantilever;

the bottom plate is connected to the shaft along a plate surface of the bottom plate; and a fixed end of the cantilever is connected to the bottom plate, a free end of the cantilever is spaced from the bottom plate, and the free end of the cantilever has a clamping protrusion.

13. The dual-core connector according to claim 12, wherein the dual-core connector further comprises a releasing rod; and wherein one end of the releasing rod is movably sleeved on the cantilever along a length direction of the cantilever, and the releasing rod is configured to drive, when the releasing rod moves towards the fixed end of the cantilever, the free end of the cantilever to move towards the bottom plate.

14. The dual-core connector according to claim 13, wherein:

the releasing rod comprises a substrate, a wedge, and two outer side plates;

perpendicular to a length direction of the substrate, two side edges of the substrate are respectively connected to the two outer side plates;

the two outer side plates are respectively in sliding fit with two side edges of the bottom plate; and the wedge is located on an end of the substrate in the length direction and on a same side of the substrate as the outer side plates, the wedge is connected to the substrate, and an oblique surface of the wedge is in sliding contact with the free end of the cantilever.

15. The dual-core connector according to claim 14, wherein an inner side surface of the outer side plate has a first sliding strip, and the first sliding strip extends along the length direction of the substrate; and wherein perpendicular to a length direction of the bottom plate, the two side edges of the bottom plate each has a first sliding slot, wherein the first sliding slot extends along the length direction of the bottom plate, and the first sliding strip is slidably inserted into the corresponding first sliding slot.

16. The dual-core connector according to claim 14, wherein:

the releasing rod further comprises two inner side plates;

the two inner side plates are located between the two outer side plates, and are both parallel to the two outer side plates; and the clamping component further comprises a guiding rib, wherein the guiding rib and the cantilever are located on a same side of the bottom plate, the guiding rib is connected to the bottom plate, the guiding rib extends along the length direction of the bottom plate, the guiding rib is inserted between the two inner side plates, and the guiding rib and the inner side plates are in sliding fit with each other.

17. The dual-core connector according to claim 16, wherein an inner side surface of the inner side plate has a second sliding strip, and the second sliding strip extends along the length direction of the substrate; and wherein perpendicular to a length direction of the guiding rib, two side surfaces of the guiding rib each has a second sliding slot, wherein the second sliding slot extends along the length direction of the guiding rib, and the second sliding strip is slidably inserted into the corresponding second sliding slot.

18. The dual-core connector according to claim 13, wherein one end of the releasing rod away from the cantilever has a label region.

19. A connection system, comprising a dual-core connector and an adapter, wherein the dual-core connector comprises a plug assembly and a clamping assembly, wherein the plug assembly comprises a housing and at least two ferrules, wherein the housing has a through hole penetrating through a first surface and a second surface of the housing that are opposite to each other, the at least two ferrules are located in the housing and extend along a length direction of the housing, and axes of the ferrules are respectively located on two sides of the through hole;

the clamping assembly comprises a clamping component and a shaft, wherein one end of the shaft is connected to the clamping component, the other end of the shaft is rotatably connected in the through hole, and wherein the shaft is rotatable relative to the housing to a locking position for the shaft and the housing to lock each other; and the dual-core connector is inserted into the adapter, and the dual-core connector and the adapter are clamped to each other through a clamping component.

20. The connection system according to claim 19, wherein when the shaft is located on one side of the first surface of the housing, the shaft is detachably inserted into one end of the through hole that penetrates the first surface; and when the shaft is located on one side of the second surface of the housing, the shaft is detachably inserted into one end of the through hole that penetrates the second surface.

* * * * *